UNITED STATES PATENT OFFICE.

ALBERT FRIEDLAENDER, OF BERLIN-HALENSEE, GERMANY, ASSIGNOR TO ARTHUR HOROWITZ, OF BERLIN, GERMANY.

PROCESS OF RENDERING HYDROXYL DERIVATIVES OF AROMATIC HYDROCARBONS SOLUBLE IN WATER.

966,820.  Specification of Letters Patent.  Patented Aug. 9, 1910.

No Drawing.   Application filed March 29, 1907.  Serial No. 365,435.

*To all whom it may concern:*

Be it known that I, ALBERT FRIEDLAENDER, doctor of philosophy, chemist, a subject of the King of Prussia, German Emperor, residing at 111 Kurfürstendamm, Berlin-Halensee, Germany, have invented new and useful Improvements in Processes of Rendering Hydroxyl Derivatives of Aromatic Hydrocarbons Soluble in Water, of which the following is a specification.

This invention relates to processes of rendering hydroxyl derivatives of aromatic hydrocarbons soluble in water.

The object of the present invention is, to use for the said purpose a means which has similar or analogous chemical character as the substances to be dissolved, so that the chemical nature of the substance to be dissolved is not influenced in an undesired direction.

The process consists in adding to the difficultly soluble or insoluble aromatic hydroxyl derivatives such hydroxyl compounds as are easily soluble in water. The solution may be effected at ordinary temperature but may be facilitated by heating.

In order to explain the manner in which my invention may be carried out, I quote the following examples:

1. A mixture of the various cresols or pure cresol is rendered soluble in water by addition of the double or triple quantity in weight of resorcin.

2. 1 kilogram of alizarin is dissolved by about 60 kilograms of phenol liquefied by addition of a little amount of water. In pouring the mixture into water only a part of alizarin is separated, the other part is dissolved with red color.

3. 1 kilogram of cresol is poured into a solution of 4 kilograms of pyrocatechin in water. The obtained clear solution may be diluted in any proportion with water.

The present process may be used for transporting the bodies in a solid state and to effect the solution at the moment of the use. One may, for instance, prepare a mixture of resorcin and cresol or resorcin and thymol in a solid state by mixing the said substances and pressing it, if desired, into tablets, etc. If one brings the said mixtures into water one obtains concentrated solutions which may be further diluted. In this manner one may prepare tablets for preparing solutions for hygienic or cosmetic purposes.

What I claim as my invention, and desire to secure by Letters Patent, is—

In the process of preparing an aqueous solution containing insoluble hydroxyl derivatives of aromatic hydrocarbons the step which consists in mixing such hydrocarbon derivatives with resorcin.

In witness whereof I have hereunto signed my name this 16th day of March 1907, in the presence of two subscribing witnesses.

ALBERT FRIEDLAENDER.

Witnesses:
HENRY HASPER,
WOLDEMAR HAUPT.